United States Patent [19]

Reade

[11] 3,962,117

[45] June 8, 1976

[54] CATHODOLUMINESCENT GLASSES ACTIVATED BY MANGANESE

[75] Inventor: Richard F. Reade, Corning, N.Y.

[73] Assignee: Corning Glass Works, Corning, N.Y.

[22] Filed: May 17, 1974

[21] Appl. No.: 470,836

[52] U.S. Cl. ............................ 252/301.4 F; 106/52
[51] Int. Cl.² .................... C09K 11/34; C03C 3/10
[58] Field of Search ................. 252/301.4 F; 106/52

[56] References Cited
UNITED STATES PATENTS

| 2,049,765 | 8/1936 | Fischer | 252/301.4 F |
| 3,081,179 | 3/1963 | Charvat et al. | 106/52 X |
| 3,522,190 | 7/1970 | Turner et al. | 252/301.4 F |
| 3,535,266 | 10/1970 | Lee | 252/301.4 F |
| 3,543,074 | 11/1970 | Turner et al. | 252/301.4 F X |
| 3,654,172 | 4/1972 | Reade | 252/301.4 F |
| 3,843,551 | 10/1974 | Muller et al. | 252/301.4 F |

Primary Examiner—Jack Cooper
Attorney, Agent, or Firm—Clinton S. Janes, Jr.; Clarence R. Patty, Jr.

[57] ABSTRACT

The present invention relates to the production of glasses which will emit a yellow-to-orange luminescence when subjected to bombardment by high energy electrons. Glasses demonstrating good efficiency and resistance to aging can be formed from a very narrowly-defined range of compositions within the alkaline earth aluminosilicate field, wherein the alkaline earth oxide is MgO, CaO, and/or SrO, which are activated by manganese.

1 Claim, No Drawings

CATHODOLUMINESCENT GLASSES ACTIVATED BY MANGANESE

Fluorescence in glass has been a recognized phenomenon for many years. Initially, this behavior (termed photoluminescence) was observed as the result of ultraviolet radiation impingement on glass compositions containing such multi-valent elements as copper, manganese, zirconium, and tin. For example, U.S. Pat. No. 2,042,425 discloses phosphate-based glasses containing tin alone or in combination with the other metals which will luminesce when subjected to short wavelength ultraviolet radiations such as are encountered in mercury or cadmium vapor layers. U.S. Pat. No. 2,400,147 describes zinc phosphate glasses containing tin with, optionally, manganese which exhibit twice the efficiency of luminescence of that displayed by the glasses of U.S. Pat. No. 2,042,425 when exposed to ultraviolet radiations of short wavelength. A more recent disclosure, U.S. Pat. No. 3,440,172, discusses photoluminescence in zinc aluminosilicate glasses containing copper, tin, and/or antimony as the activating agents.

Experience has shown that many glasses which demonstrate strong luminescence under ultraviolet radiation perform quite poorly when subjected to excitation by cathode rays. Nevertheless, the transparency and freedom from light-scattering defects inherently present in glass bodies have fostered extensive research to develop glass compositions which would luminesce strongly when exposed to a beam of electrons. Such glass would be especially suitable for the production of transparent faceplates or screens for cathode ray tubes or other applications where image contrast or image resolution is of vital significance. The results of this research have been generally discouraging in that the glasses developed have conventionally exhibited poor cathodoluminescence efficiency or inadequate resistance to aging when subjected to long term electron bombardment, or both. Hence, glasses manifesting cathodoluminescence efficiencies of less than about 1% and/or aging resistances of less than about 33% are common. Furthermore, it has frequently been found that glasses demonstrating the highest efficiencies have, unfortunately, exhibited very poor aging resistance. In view of that situation, a cathodoluminescent glass displaying a power conversion efficiency greater than about 0.5% in combination with a resistance to aging in excess of about 40% would be considered a significant improvement upon the glasses of the prior art.

Recent patents concerned with cathodoluminescent glasses includes U.S. Pat. No. 3,543,074, involving alkali metal-alkaline earth metal-aluminosilicate glasses activated by copper, and U.S. Pat. No. 3,654,172, disclosing alkali metal-alkaline earth metal-silica glasses activated by terbium.

The primary objective of the instant invention is to provide glasses of improved efficiency and greatly-improved aging resistance which exhibit a yellow-to-orange luminescence when exposed to electron bombardment.

That objective can be achieved within a very limited range of alkaline earth aluminosilicate base compositions through activation with manganese. Hence, glasses operable in the instant invention consist essentially, by weight on the oxide basis, of about 45–65% $SiO_2$, 15–35% $Al_2O_3$, 5–30% RO, wherein RO consists of 0–30% MgO, 0–20% CaO, and/or 0–20% SrO, and 0.25–3% manganese expressed as MnO. Superior luminescent characteristics result where MgO is employed as the alkaline earth oxide although acceptable glasses can be secured with CaO and/or SrO. However, glasses containing BaO have not been found operable when present alone.

Minor amounts of extraneous compatible materials can be included in the glass compositions to adjust the chemical and physical properties thereof to desired values. For example, alkai metal oxides and fluoride ion can be included as fluxes and conventional fining agents, such as $As_2O_3$, can be added in customary amounts. The inclusion of $ZrO_2$ in amounts up to about 5% appears to significantly improve the aging resistance of the glasses. Small amounts of SnO, viz., up to about 0.5%, aid in stabilizing the manganous ion ($Mn^{+2}$), and, in so doing, inhibit the transformation of $Mn^{+2}$ ions to the manganic ions ($Mn^{+3}$). The presence of $Mn^{+3}$ ions imparts a violet or violet-brown hue or tint to the glass. Therefore, in essence, the inclusion of SnO acts to decolorize the glass or, conversely, prevents the development of color in the glass. Inasmuch as the mechanism through which these glasses exhibit cathodoluminescence is believed to involve a reaction which can be likened to the transition of $Mn^{+2}$ ions to $Mn^{+3}$ ions, the presence of $Mn^{+3}$ ions in the glass structure will obviously reduce luminescence efficiency. It is also apparent that the level of SnO must not be so high as to adversely affect the luminescing performance of the glass. The presence of $La_2O_3$ seems to augment to efficiency of some glasses and amounts up to 15% can be employed without destroying the stability of the glass. In general, the sum of additions to the base glass, other than $La_2O_3$, will not exceed about 10%.

Table I records a group of glass compositions, expressed in weight percent on the oxide basis, operable in the present invention. The batch ingredients therefor can comprise any materials, either oxides or any compounds, which, when melted together, will be converted to the desired oxide in the proper proportions. In each example, the batch ingredients were compounded, ballmilled together to aid in securing a homogeneous melt, and deposited within a platinum crucible. The crucible was placed within an electrically-fired furnace operating at 1550°–1750°C., and maintained therewithin for about 4–16 hours. The melt was poured into a steel mold or rolled into slabs and those bodies immediately transferred to an annealer operating at 700°–900°C.

Table I

|  | 1 | 2 | 3 | 4 | 5 | 6 | 7 | 8 |
|---|---|---|---|---|---|---|---|---|
| $SiO_2$ | 62.62 | 67.69 | 55.74 | 51.22 | 53.08 | 65.91 | 60.60 | 53.15 |
| $Al_2O_3$ | 28.34 | 22.98 | 31.53 | 34.76 | 18.01 | 22.97 | 27.44 | 30.06 |
| MgO | 8.40 | 8.77 | 12.47 | 13.36 | 28.49 | — | — | — |
| CaO | — | — | — | — | — | 10.75 | 11.32 | 16.54 |
| MnO | 0.64 | 0.56 | 0.26 | 0.66 | 0.42 | 0.37 | 0.64 | 0.25 |

Table I-continued

|  | 9 | 10 | 11 | 12 | 13 | 14 | 15 | 16 |
|---|---|---|---|---|---|---|---|---|
| $SiO_2$ | 59.51 | 70.00 | 49.54 | 62.35 | 50.69 | 50.44 | 50.34 | 50.76 |
| $Al_2O_3$ | 20.19 | 25.88 | 29.43 | 26.45 | 34.40 | 34.24 | 34.18 | 33.84 |
| MgO | — | 8.80 | 5.54 | 9.73 | 12.10 | 10.56 | 10.54 | 13.79 |
| SrO | 19.81 | — | — | — | — | — | — | — |
| $La_2O_3$ | — | 2.89 | 14.91 | — | — | — | — | — |
| $As_2O_3$ | — | 0.17 | — | 0.18 | 0.18 | — | 0.18 | — |
| $MgF_2$ | — | — | — | — | — | 3.45 | 3.45 | — |
| $Li_2O$ | — | — | — | — | — | — | — | 0.28 |
| MnO | 0.49 | 1.26 | 0.58 | 1.29 | 2.63 | 1.31 | 1.31 | 1.33 |

|  | 17 | 18 | 19 | 20 | 21 | 22 | 23 | 24 |
|---|---|---|---|---|---|---|---|---|
| $SiO_2$ | 49.50 | 54.46 | 51.97 | 54.34 | 50.72 | 49.72 | 49.47 | 50.35 |
| $Al_2O_3$ | 33.00 | 30.81 | 29.40 | 30.73 | 28.04 | 32.82 | 32.67 | 33.25 |
| MgO | 9.76 | 12.11 | 11.56 | 11.42 | — | 10.41 | 9.61 | 12.75 |
| $MgF_2$ | 5.71 | — | — | — | — | 3.40 | 3.39 | — |
| $Li_2O$ | 0.55 | — | — | — | — | — | — | — |
| $Cs_2O$ | — | — | 2.43 | — | — | — | — | — |
| $ZrO_2$ | — | 2.23 | 4.27 | 2.23 | 2.16 | 2.24 | 2.23 | 2.27 |
| $As_2O_3$ | 0.18 | — | — | — | — | — | — | — |
| CaO | — | — | — | — | 18.46 | — | — | — |
| SnO | — | — | — | — | — | 0.12 | 0.06 | 0.06 |
| MnO | 1.30 | 0.39 | 0.37 | 1.28 | 0.62 | 1.29 | 2.57 | 1.31 |

|  | 25 | 26 | 27 | 28 | 29 | 30 | 31 | 32 |
|---|---|---|---|---|---|---|---|---|
| $SiO_2$ | 49.75 | 49.16 | 48.58 | 50.45 | 50.00 | 49.56 | 48.34 | 47.16 |
| $Al_2O_3$ | 32.85 | 32.46 | 32.08 | 33.31 | 33.02 | 32.73 | 31.92 | 31.14 |
| MgO | 10.40 | 8.09 | 5.85 | 8.31 | 8.23 | 8.16 | 7.96 | 7.77 |
| $MgF_2$ | 3.41 | 6.73 | 9.98 | 3.45 | 3.42 | 3.39 | 3.31 | 3.23 |
| $ZrO_2$ | 2.24 | 2.22 | 2.19 | 2.28 | 2.26 | 2.24 | 2.18 | 2.13 |
| SnO | 0.06 | 0.06 | 0.06 | 0.06 | 0.06 | 0.06 | 0.06 | 0.06 |
| MnO | 1.29 | 1.28 | 1.26 | 1.31 | 1.30 | 1.29 | 1.26 | 1.23 |
| $Li_2O$ | — | — | — | 0.83 | — | — | — | — |
| $Na_2O$ | — | — | — | — | 1.70 | — | — | — |
| $K_2O$ | — | — | — | — | — | 2.56 | — | — |
| $Rb_2O$ | — | — | — | — | — | — | 4.96 | — |
| $Cs_2O$ | — | — | — | — | — | — | — | 7.30 |

Plates about ½ inch × ½ inch × 1 mm were cut from the above samples and polished. Visual observations were conducted on these plates utilizing a commercially available apparatus permitting the inspection of cathodoluminescence resulting from the impingement of electrons at energies up to 11 kilovolts (KV). Quantitative measurements were carried out on a number of samples at about 25 KV electron energy employing a demountable cathode ray tube with appropriate control, monitoring, and spectroradiometric equipment.

Table II sets forth the wave length providing the maximum intensity of luminescence ($\lambda$ max.), the power conversion efficiency (PCE), and the aging resistance (AR) determined via a standard aging test. The power conversion efficiency reflects the capability of the sample to convert the power or energy of the electron beam incident thereon into visible radiation. This property is delineated in terms of watts of radiant power produced per unit power, also expressed in watts, of the incident electron beam. Aging, defined as the loss of luminescence intensity under sustained electron bombardment, is measured during an accelerated aging test in which the sample is exposed to a high current density (30 microamperes/cm$^2$) of electrons at a high energy level (25 KV) for a period of ten minutes. Aging resistance is described as the ratio of the intensity of cathodoluminescence after ten minutes exposure to the test conditions, to the intensity displayed at the commencement of the test.

Table II

| Example No. | $\lambda$ max. | PCE | AR |
|---|---|---|---|
| 1 | 6200 A | 1.5 | 59 |
| 2 | 6100 A | 1.0 | — |
| 3 | 6100 A | 0.6 | 53 |
| 4 | 6200 A | 1.5 | 67 |
| 5 | 6100 A | 1.0 | 67 |
| 6 | 5600 A | 0.6 | 57 |
| 8 | 6100 A | 0.5 | 42 |
| 9 | 6100 A | 1.7 | — |
| 10 | 6200 A | 1.1 | 59 |
| 11 | 6050 A | 1.3 | 68 |
| 12 | 6200 A | 1.0 | 65 |
| 13 | 6250 A | 1.1 | 59 |
| 14 | 6200 A | 1.4 | 63 |
| 15 | 6200 A | 1.5 | 69 |
| 16 | 6100 A | 1.1 | 63 |
| 17 | 6200 A | 2.0 | 54 |
| 18 | 6050 A | 1.2 | 83 |
| 19 | 6050 A | 0.8 | 100 |
| 20 | 6200 A | 1.0 | 79 |
| 21 | 6200 A | 0.7 | — |
| 22 | 6100 A | 1.4 | 83 |
| 24 | 6100 A | 1.5 | 79 |
| 25 | 6300 A | 1.5 | 75 |
| 26 | 6300 A | 1.7 | 70 |
| 27 | 6200 A | 2.0 | 63 |
| 28 | 6300 A | 1.9 | 62 |
| 29 | 6300 A | 1.8 | 71 |
| 30 | 6300 A | 2.0 | 73 |
| 31 | 6200 A | 1.7 | 78 |
| 32 | 6200 A | 1.7 | 77 |

The mechanism of cathodoluminescence operating in these manganese-doped, alkaline earth aluminosilicate glasses of the instant invention is not fully understood. However, it is believed that an incident electron striking the glass excites and ionizes nearby atoms or ions to produce secondary electrons in the conduction band and corresponding electron vacancies, or holes, in the valence band. A manganous ion ($Mn^{+2}$) may lose an outer electron to a nearby hole in the valence band thereby "trapping" the hole at the manganese center. Chemically, the process may be likened to the oxidation of the divalent manganous ion to the trivalent manganic state ($Mn^{+3}$). Subsequently, an electron from the conduction band may recombine with the trapped hole to produce a manganous ion in a highly energetic, excited, state. This excited ion may lose some of its excess energy, as heat to its surroundings, until some lower-energy excited state is reached from which a transition can occur which produces visible light, commonly referred to as luminescence emission.

Even the most cursory study of Table II quickly points up the superior cathodoluminescent properties demonstrated by those glasses when compared with those found in the prior art. Thus, power conversion efficiencies of 2% and higher are attainable with aging resistances, as measured in the forementioned test, approaching and actually equaling 100%. A minimum of at least 5% MgO, CaO, and/or SrO has been found necessary, whereas the inclusion of greater than the recited levels thereof leads to a significant decrease in luminescence with respect to CaO and SrO-containing glasses and opalization of the glass when MgO is present in excessive amounts. The greatest efficiencies appear to be achieved when the alkaline earth metal oxide content is in excess of 10%.

Examples 3 and 8 illustrate the need for a manganese content, expressed as MnO, of at least 0.25%. Contents in excess of 3% MnO can be utilized but the intensity of the luminescence, the power conversion efficiency, and the aging resistance resulting therefrom appear not to be significantly different from glasses containing lesser amounts. Therefore, the use of larger quantities of MnO is not considered to be economically attractive.

The very marked effect which the inclusion of $ZrO_2$ exerts upon the aging characteristics of the glasses is clearly demonstrated in Examples 18–23. This factor, coupled with the ability of SnO to decolorize the glass, has led to the preferred glasses containing these ingredients. Commonly, $ZrO_2$ in an amount of at least 2% and SnO in an amount of at least 0.05% will be included.

Examples 24–27 demonstrate the adverse effect upon aging resistance imparted by high fluoride levels and Examples 28–32 indicate that the presence of the alkali metal oxides can also have a deleterious effect upon aging resistance. Therefore, these components, when present, will preferably be included in amounts not exceeding about five cation percent total.

The amounts of $Al_2O_3$ and $SiO_2$ circumscribe the composition areas suitable for practical glass melting and forming. Problems of glass stability are hazarded outside of the specified ranges.

I claim:

1. A yellow-to-orange emitting cathodoluminescent glass consisting essentially, by weight on the oxide basis, of about 45–65% $SiO_2$, 15–35% $Al_2O_3$, 5–30% RO, wherein RO consists of at least one alkaline earth metal oxide in the indicated proportion of 0–30% MgO, 0–20% CaO, and 0–20% SrO, 2–5% $ZrO_2$, 0.05–0.5% SnO, and 0.25–3% manganese, expressed as MnO.

* * * * *